(12) United States Patent
Pratt

(10) Patent No.: US 10,165,264 B1
(45) Date of Patent: Dec. 25, 2018

(54) FLOATING CALIBRATION TARGET FOR IMAGE SENSOR

(71) Applicant: Patricia D. Pratt, Redondo Beach, CA (US)

(72) Inventor: Patricia D. Pratt, Redondo Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 305 days.

(21) Appl. No.: 15/294,379

(22) Filed: Oct. 14, 2016

(51) Int. Cl.
*G01J 1/10* (2006.01)
*H04N 17/00* (2006.01)

(52) U.S. Cl.
CPC .................................. *H04N 17/002* (2013.01)

(58) Field of Classification Search
CPC .................................................... H04N 17/002
USPC ....................................................... 348/144
See application file for complete search history.

(56) References Cited

U.S. PATENT DOCUMENTS

| 8,767,210 B1 | 7/2014 | Lukashin et al. |
| 2009/0232356 A1 | 9/2009 | Schwartz |
| 2015/0156998 A1* | 6/2015 | Terry ............... A01K 75/00 43/4.5 |

OTHER PUBLICATIONS

Rao, et al.: "Post-Launch Calibration of Meteorological Satellite Sensors"; Adv. Space Res., vol. 23, No. 8, pp. 1357-1365, 1999.

* cited by examiner

*Primary Examiner* — Nguyen T Truong
(74) *Attorney, Agent, or Firm* — Tarolli, Sundheim, Covell & Tummino LLP

(57) ABSTRACT

A floating calibration target for an image sensor can include a plurality of hexagonally shaped floatation devices that each emit light at one or more predetermined wavelengths. The floating calibration target can also include a seine net circumscribing the plurality of hexagonally shaped floatation devices. The seine net draws the plurality of hexagonally shaped floatation devices toward each other to form a substantially contiguous surface for the floating calibration target.

20 Claims, 4 Drawing Sheets

FLOATING CALIBRATION TARGET FOR IMAGE SENSOR

TECHNICAL FIELD

This disclosure relates to a floating calibration target for an image sensor.

BACKGROUND

Meteorological satellites operating in geostationary orbits around the Earth provide observations of the Earth's surface and clouds. Images in or near the visible spectral domain can be used for the weather forecast and for monitoring important climate variables such as the surface insolation, surface albedo, pollution, smog and cloud characteristics. In some examples, such meteorological satellites can employ hyperspectral imaging.

Calibrating imagers is a common pre-processing step for remote sensing analysts that need to extract data and create scientific products from images. Calibration attempts to compensate for radiometric errors from sensor defects, variations in scan angle, and system noise to produce an image that represents true spectral radiance at the sensor.

SUMMARY

One example relates to a floating calibration target for an image sensor that can include a plurality of hexagonally shaped floatation devices that each emit light at one or more predetermined wavelengths. The floating calibration target can also include a seine net circumscribing the plurality of hexagonally shaped floatation devices. The seine net draws the plurality of hexagonally shaped floatation devices toward each other to form a substantially contiguous surface for the floating calibration target.

Another example relates to a floating calibration target for an image sensor that can include a plurality of floatation devices. Each of the plurality of floatation devices can include a buoy with a hexagonal surface and a plurality of light sources affixed on the hexagonal light surface that each emit light at one or more predetermined wavelengths. The floating calibration target can also include a seine net circumscribing the plurality of floatation devices. The seine net can apply a force that draws the plurality of floatation devices toward each other to form a substantially contiguous surface for the floating calibration target. The floating calibration target can further include a wireless beacon to output data characterizing a current location of the floatation calibration target.

Yet another example relates to a floating calibration target for an image sensor that can include a plurality of floatation devices. Each of the plurality of floatation devices can include a hexagonally shaped net formed of a buoyant material and a plurality of fiber optic cables extending between edges of the hexagonally shaped net. Each of the plurality of fiber optic cables can output light injected therein. The floating calibration target can also include a seine net circumscribing the plurality of floatation devices. The seine net can apply a force that draws the plurality of floatation devices toward each other to form a substantially contiguous surface for the floating calibration target. The floating calibration target can further include a wireless beacon to control the output of light emitted by the plurality of floatation devices.

DETAILED DESCRIPTION

The examples described herein relate to an apparatus for calibrating multispectral and hyperspectral image sensors (on-board optical sensors) of airborne vehicles and/or satellites for imaging errors using an in-situ system of illuminated water floating light devices. In one example, the in-situ illuminated water floating system comprises a seine net (water deployable net) and a plurality of floating devices (e.g., buoys) having translucent hexagonal top surfaces, and location emitters (wireless beacons) to provide remote tracking/location functionality of the plurality of floating devices. In some examples, the plurality of floating devices is suspended within a purse of the seine net (or a portion of the purse of the seine net) and can be arranged therein side-by-side such that each translucent hexagonal top surface is contiguous to at least one other top surface of a given floating device to form a water floating platform. The translucent hexagonal top surfaces each include a plurality of light emitting sources that can be controlled to emit light to provide an illuminated water floating platform. The illuminated water floating platform can be used as a light source for calibrating the image sensor.

In another example, the in-situ illuminated water floating device can include a plurality of hexagonal (shaped) floating nets that contain fiber optic cables and a location emitter (wireless beacon) to provide remote tracking/location functionality of a corresponding hexagonal floating net and fiber optic cables that can be configured to emit light at varying power levels and at given wavelengths for calibration of the image sensor. The fiber optic cables can be illuminated by a light source, such as a laser deployed on a boat. The plurality of hexagonal floating nets can be suspended within the purse of the seine net and arranged side-by-side such that each hexagonal floating net is contiguous to at least one other hexagonal floating net and form the illuminated water floating platform. Airborne vehicles and/or satellites can be configured to fly-over the illuminated water floating platform such that pixels of the multispectral and hyperspectral imagery devices can be calibrated to reduce imaging errors in such devices.

Stringing a series of nets together in a long line can produce a bright-light "edge" needed for geolocation to perform the Modulation Transfer Function (MTF) commonly used in satellite calibration. In the present examples described herein, the term "bright light" denotes light on nearly any part of the EM spectrum.

Figure 1:
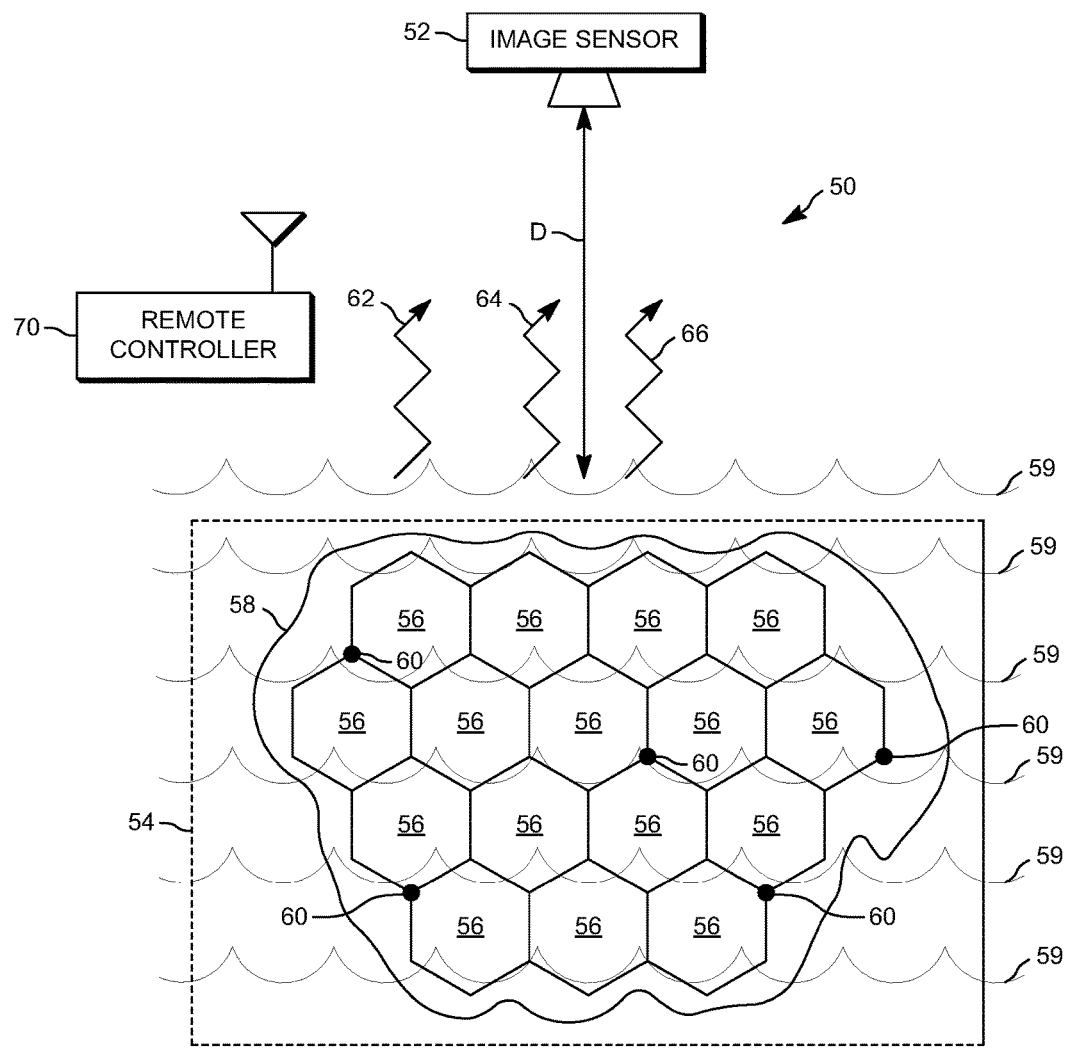
FIG. 1 illustrates an example of a system for calibrating an image sensor.

FIG. 1 illustrates an example of a system 50 for calibrating an image sensor 52. The image sensor 52 can be an airborne imager. For instance, the image sensor 52 can be deployed on an aircraft or a satellite. The image sensor 52 can be a multispectral image sensor or a hyperspectral image sensor. As used herein, the term multispectral denotes a plurality of discrete bands in the electromagnetic (EM) wave spectrum. In such a situation, the image sensor 52 can be configured to receive EM waves in 3 or more bands (e.g., corresponding to red, blue and green). Alternatively, the image sensor 52 can be implemented as a hyperspectral image sensor and can be configured to receive EM waves in 100 bands or more (e.g., 300 bands or more). Additionally, as used herein, the term "hyperspectral" denotes a plurality of continuous bands in the EM wave spectrum, wherein each of the bands have a bandwidth of about 15 nanometers (nm) or less (e.g., 3 nm to 15 nm).

The image sensor 52 can be configured to capture images of a given area. As noted, the image sensor 52 is airborne, such that the given area can be a specific geographic area of the Earth. In some examples, the specific geographic area can include land and/or water.

Due to environmental variables (e.g., change of temperature, vibrations, etc.), the image sensor 52 may need calibration on a periodic and/or as-needed (e.g., ad-hoc) basis. In such a situation, the image sensor 52 can be configured to capture an image of a floating calibration target 54. The floating calibration target 54 can have predetermined size, color and functional characteristics that can be relied upon by the image sensor 52 to facilitate calibration. As described herein, the floating calibration target 54 can be relatively buoyant for deployment in a body of water. Additionally, in some examples, the floating calibration target 54 can have a slightly negative buoyancy to allow the light provided by the floating calibration target 54 to first travel through a lens of water for measuring the signal after the water has absorbed and scattered the light thus allowing for characterizing the properties of the water.

The floating calibration target 54 can be formed from K number of floatation devices 56, where K is an integer greater than or equal to two. Each of the K number of floatation devices 56 can have a hexagonal shape. In one example, each floatation device 56 can be formed as a buoy with a rigid translucent hex top ring with light sources attached thereto to emit light. The lights could be, for example, light emitting diodes (LEDs). Each of the LEDs (or other light source) can be configured to emit light a varying power levels in one or more predetermined bands for calibration of the image sensor 52. The LEDs (or other light source) can be powered by a battery.

In another example, each of the K number of floatation devices 56 can be implemented as a floating net having fiber optic cables that can emit light. Each of the floating nets can have a hexagonal shape. In this example, each floatation device 56 (via the fiber optic cables) can be configured to emit light at varying power levels and in one or more predetermined bands for calibration of the image sensor 52.

In either example (where the floatation device 56 includes a buoy or a floating net), the K number of floatation devices 56 can be suspended by the outer rim of a purse seine net 58. Moreover, the seine net 58 can include a purse line to apply tension on the seine net 58 and force the K number of floatation devices 56 toward each other. Due to the hexagonal shape of the K number of floatation devices 56, the floatation devices 56 nest in a substantially uniform manner. Accordingly, the K number floatation devices 56 of can be arranged side-by-side such that each of the translucent hexagonal top surfaces or the hexagonal floating nets are contiguous to at least one other top surface or hexagonal floating net of a given floatation device 56 to form an illuminated floating platform for the floating calibration target 54. Moreover, the seine net 58 prevents the K number of floatation devices 56 from drifting apart and allows for easy retraction of the floating calibration target 54.

The floating calibration target 54 can include N number of wireless beacons 60, where N is an integer greater than or equal to one. Each wireless beacon 60 can transmit location information for the floating calibration target 54. Each wireless beacon 60 can include, for example, a computing device (e.g., a microcontroller) and an antenna. In some examples, each of the N number of wireless devices 60 can be implemented as a global navigation satellite system (GNSS), such as a global position system (GPS) transceiver and/or a GLONASS transceiver. In such a situation, the location information output by the N number of wireless beacons 60 can be a currently calculated latitude and longitude of the floating calibration target 54. Moreover, the location information can be updated periodically and/or asynchronously.

Additionally, one of more of the wireless beacons 60 can control an output of light by the K number of floatation devices. Moreover, in some examples, the one or more of the wireless beacons 60 can communicate with an external system to facilitate the control of the output of the light, as described herein.

The floating calibration target 54 can have total area, $A_{Total}$ that is approximately equal to the sum of an area of each floatation device 56, $A_i$ (wherein each floatation device 56) has a hexagon shape, and is an integer between 1 and K. Thus, the area of each floatation device 56 can be calculated with Equation 1.

$$A_i = \frac{3\sqrt{3}}{2} R_i^2 \qquad \text{Equation 1}$$

Wherein:
  $A_i$ is the area of the ith floatation device; and
  $R_i$ is the circumradius of the ith floatation device.

In operation, the floating calibration target 54 can simulate flares that are typically implemented in image sensor calibration. In particular, the K number of floatation devices 56 can be organized such that a bright source of light can be generated, particularly at night such that the image sensor 52 (e.g., deployed on a satellite) can measure radiance and establish geolocation.

For example, the floating calibration target 54 can be sized and/or illuminated in a manner that the image sensor 52 can capture a measurable quantity of light of at least 7.9 photons per every 91 meters (about 300 feet) of a distance "D" between the image sensor 52 and the floating calibration target 54 if the image sensor 52 is traveling at a high velocity (e.g., such as in a satellite moving at a rate of about 7000 m/s). In situations where the image sensor 52 is traveling slower, the image sensor 52 is likely able to operate properly while capturing a higher number of photons per 91 meters of the distance D from the longer dwell time or lower altitude. Such illumination can be generated at the floatation devices 56 of the floating calibration target 54. Additionally, it is noted, that in many examples, the floating calibration target 54 can generate light several orders of magnitude greater than the minimum needed to be detected by the image sensor 52.

In a situation where the image sensor 52 is mounted on an aircraft, each pixel of the image sensor 52 can correspond to an area size of at least 5 meters (m) by 5 meters. Accordingly, in such a situation, the floating calibration target 54 has a total area, $A_{Total}$ of at least about 25 square meters (m$^2$) or more. In situations where the image sensor 52 is mounted on a satellite, each pixel of the image sensor 52 can correspond to an area size of at least 250 m by 250 m. Accordingly, the floating calibration target 54 can have a total area, $A_{Total}$ of at least about 62,500 m$^2$. As noted, the size of the floating calibration target 54 can be proportional to the predetermined approximate distance, D of separation between the image sensor 52 and the floating calibration target 54. That is, the larger the predetermined approximate distance, D of separation between the image sensor 52 and the floating calibration target 54, the larger the floating calibration target 54 may be.

Furthermore, in some examples, the calibration target 54 can include multiple instances of the seine net 58 (each with the K number of floatation devices 56 and wireless beacons 60 deployed therein) that are arranged in an array to achieve a desired total area, $A_{Total}$ for the calibration target 54. As one an example, the seine net 58 can be implemented as a purse seine net that has have a perimeter of about 1 km (1000 m) in length. In such a situation, the seine net 58 can form a circular shape (or approximately circular), such that the seine net 58 can circumscribe a circle with a diameter of about 318 m (0.318 km) and the seine net 58 can circumscribe and area of about 79,577 m$^2$ (0.079577 km$^2$). In this situation, forming an array of 4×4 such seine nets 58 can provide a total area, $A_{Total}$ for the calibration target 54 of about 1,273,232 m$^2$ (1.273232) km$^2$, which exceeds a typical sized pixel aggregation for a Low Earth Observing (LEO) satellite (which pixel aggregation is typically about 1 km$^2$).

Each of the K number of floatation devices 56 can output visible light rays with a specific radiance. In particular, the light waves output by the K number of floatation devices 56 can be a single color or a mix of colors on a predetermined set of spectral bands (e.g., a single spectral band or a plurality of spectral bands). The light rays output by the K number of floatation devices 56 are depicted in FIG. 1 as arrows 62, 64 and 66. The predetermined set of spectral bands can correspond to the spectral bands detectable by the image sensor 52.

The floating calibration target 54 can be deployed in a body of water represented as lines 59. The body of water 59 can be, for example, an ocean, sea or lake. In some examples, the floating calibration target 54 can be floating in water.

The image sensor 52 can capture/sample a portion of the light rays 62, 64 and 66 emitted by the K number of floatation device 56 of the floating calibration target 54. The light output by the floating calibration target 54 (indicated by the light rays 62, 64 and 66) can have sufficient luminance (e.g., brightness) to saturate at least one pixel of the image sensor 52. Moreover, since the wavelengths and frequencies radiated from the floatation devices 56 are predetermined and can be programmed into the image sensor 52, the image sensor 52 can be calibrated. The calibration of the image sensor 52 can compensate for errors/drift caused by environmental conditions (e.g., temperature), atmospheric variables (e.g., airborne dust, water zone vapor, etc.) and/or atmospheric attenuations.

The floating calibration target 54 can be controlled by a remote controller 70. The remote controller 70 can be representative of one or more computing devices. The remote controller 70 can communicate wirelessly with the floating calibration target 54. One or more wireless beacons 60 can communicate wirelessly with the remote controller 70 to control an output of the K number of floatation devices. Additionally, the remote controller 70 can communicate with the image sensor 52 to initiate a calibration procedure.

In some examples, the image sensor 52 can include a plurality of sub-image sensors that each detects a different, single, spectral band of light. For instance, in such a situation, the image sensor 52 could include 3 sub-image sensors that detect red, blue and green light, respectively. In this situation, during a calibration procedure, the output of the floatation devices 56 can be changed periodically and/or asynchronously to fine tune calibration of each of the plurality of sub-image sensors of the image sensor 52.

In one example, during a calibration procedure, the remote controller 70 can cause each of the K number of floatation devices 56 (or some subset thereof) to output a solid color in a particular spectral band to be detected by a particular sub-image sensor of the image sensor 52. For example, the K number of floatation devices 56 can output a red color and the sub-image sensor of the image sensor 52 that detects red can be calibrated, which sub-image sensor can be referred to as a red sub-image sensor. Additionally, in this situation, the remote controller 70 can cause the floatation devices 56 to output a blue color for the red sub-image sensor of the image sensor 52. During this portion of the calibration, the amount of blue light detected by the red sub-image sensor can be measured to determine an amount of "cross talk" corresponding to an unwanted transfer signal detected by the red sub-image sensor.

Additionally or alternatively, the remote controller 70 can cause different floatation devices 56 to output different solid colors. For example, the remote controller 70 can cause a first set of the K number of floatation devices 56 to output a red color, a second set of the K number of floatation devices 56 to output a blue color and a third set of the K number of floatation devices 56 to output a green color. In such a situation, the light rays 62, 64 and 66 can represent different colors. In situations where the light rays 62, 64 and 66 are different colors, the image sensor 52 can detect the output of the floating calibration target 54 as a single color since the colors aggregate, integrate and combine over the distance D between the image sensor 52 and the floating calibration target 54 similarly to natural and desired targets on the earth's surface of interest to the image sensor 52. Establishing a known source gives insight into the validation of real targets needed by mission objectives.

Additionally or alternatively, the intensity of light output by the K number of floatation devices 56 (or some subset thereof) can be varied to change the color observed by the image sensor 52. By combining a variance in intensity and color (wavelength) of light output by the K number of floatation devices 56, nearly any color can be output by the floating calibration target 54. Accordingly, the floating calibration target 54 can be employed to calibrate the image sensor 52 in situations where the image sensor 52 employs a large spectrum of detectable bands, such as a hyperspectral image sensor.

In other examples, the floating calibration target 54 can be employed in a plant functional typing procedure for aquatic life. Each species of phytoplankton absorbs and transmits different light waves. Accordingly, the remote controller 70 can control the output of the K number of floatation devices 56, which can cause the K number of floatation devices 56 (or some subset thereof) to output light at a predetermined wavelength, which can be shined through/on phytoplankton of a specific species similar to artificially controlling the bottom surface type. In such a situation, the image sensor 52 can detect and measure the amount of light and the wavelength of the light transmitted by the floatation devices 56 and through the phytoplankton. This measurement can be employed (e.g., by the remote controller 70 or another computing device) to determine the species of the phytoplankton, as well as the density of the phytoplankton in the water 59.

The floating calibration target 54 can be easily deployed and/or retracted in a remote location (e.g., by a boat, such as a fishing vessel) that is away from artificial sources of light (e.g., cities) to maintain a dark background to increase the contrast between the floating calibration target 54 and the body of water 59. For instance, to deploy the floating calibration target 54, a boat can deploy the seine net 58 and then deploy the K number of individual floatation devices 56 and the N number of wireless beacons 60 individually, thereby reducing the need for specialized equipment. Moreover, in some examples the floating calibration target 54 can be deployed in a temporary manner (e.g., 1-2 days). In other examples, the floating calibration target 54 can be deployed in a permanent/semi-permanent manner, and only minimal and infrequent maintenance, such as battery recharging/changing and/or anti-biofouling techniques may be needed.

Figure 2:
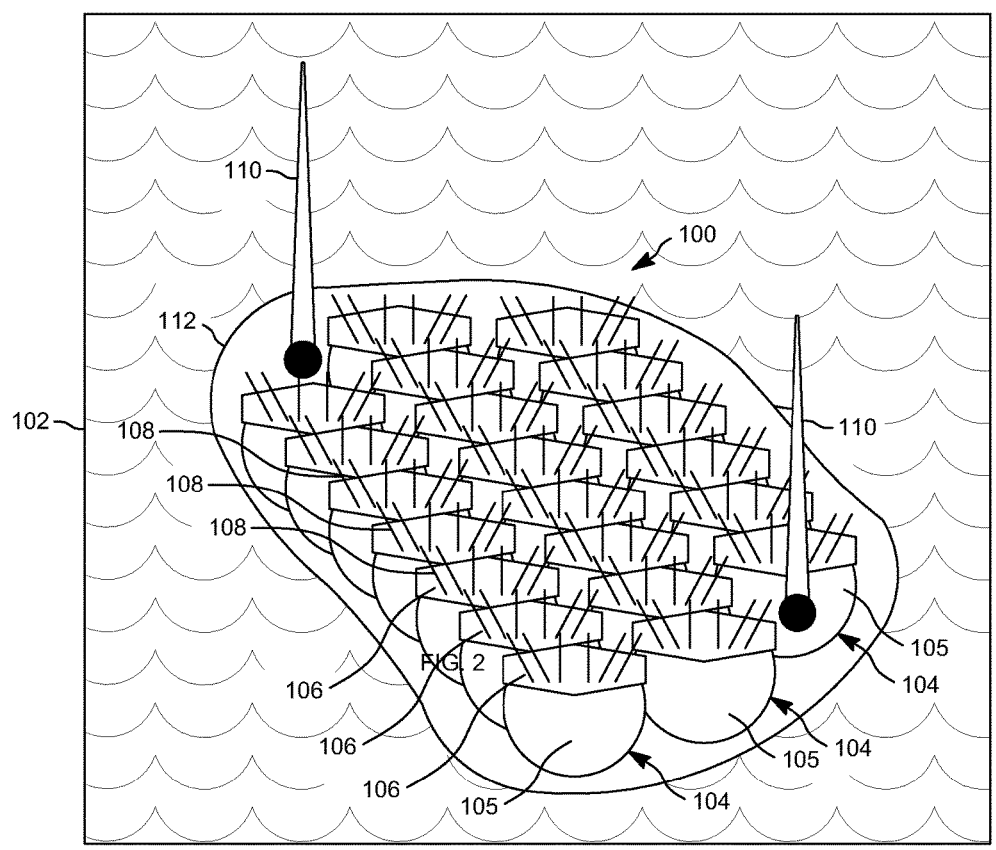
FIG. 2 illustrates an example of a floating calibration target for an image sensor.
Figure 3:
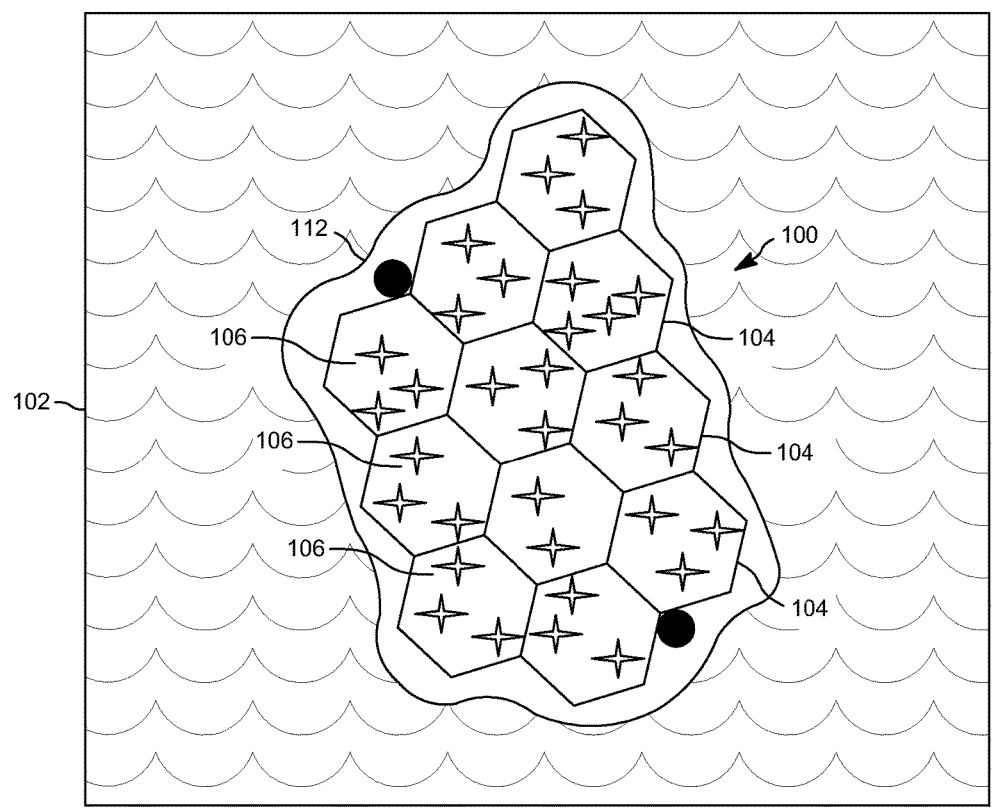
FIG. 3 illustrates a top view of a floating calibration target for an image sensor deployed in a body of water.

FIG. 2 illustrates an example of a floating calibration target 100 that can be employed, for example, to implement the floating calibration target 54 of FIG. 1. FIG. 3 illustrates an overhead view of the floating calibration target 100 of FIG. 2. For purposes of simplification of explanation, the same reference numbers are employed in FIGS. 2 and 3 to denote the same structure. The floating calibration target 100 can be floating in a body of water 102. The body of water 102 can be, for example, an ocean, a sea, a lake, etc.

The floating calibration target 100 can include K number of floatation devices 104 formed as a buoy 105 with a rigid translucent hex top ring 106 with light sources attached thereto to emit beams of light, which beams of light are labeled with reference number 108. As illustrated, the buoys 105 can have a spherical (or semispherical) shape, wherein the top ring 106 is affixed to a top portion of the buoy 105. For purposes of simplification of explanation, only some of the floatation devices 104 are labeled in with reference numbers in FIG. 2 and FIG. 3. However, it is to be understood that other floatation devices 104 can be implemented in a similar manner. The floating calibration target 100 can include N number of wireless beacons 110. The N number of wireless beacons 110 can control an output of the floatation devices 104 and/or provide location information (e.g., latitude and longitude coordinates) to an external system (e.g., the remote controller 70 of FIG. 1).

Each of the light sources providing the beams of light 108 can be powered by a power source (e.g., a battery). Moreover, in some examples, each of the K number of floatation devices 104 can have a (low power) wireless interface (e.g., Bluetooth or ZigBee) that communicates with the N number of wireless beacons 110 to control an output state (e.g., enable, disable, color and/or intensity) of the light sources.

The floating calibration target 100 can further include a seine net 112 that circumscribes the K number of floatation devices 104 and the N number of wireless beacons 110. The seine net 112 can be a purse seine net with a plurality of rings and can be nearly any depth that is needed/desired. The seine net 112 can include a purse line passing through the rings that can draw the K number of floatation devices 104 toward each other. Moreover, due to the hexagonal shape of the top of the floatation devices 104, the K number of floatation devices 104 nest to form a substantially contiguous surface for the floating calibration target 150.

The floating calibration target 100 can be easily deployed in remote locations (e.g., by a boat) that is away from artificial sources of light to maintain a high contrast between the body of water 102 and the floating calibration target 100. Furthermore, individual pieces (e.g., the K number of floatation devices 104) of the floating calibration target 100 can be deployed and/or retracted over a time period. In this manner, the need for specialized equipment to deploy or retract the floating calibration target 100 can be reduced. Moreover, due to the simplicity of the design of the floating calibration target, only minimal and infrequent maintenance, such as battery recharging/changing and/or anti-biofouling techniques may be needed.

Figure 4:
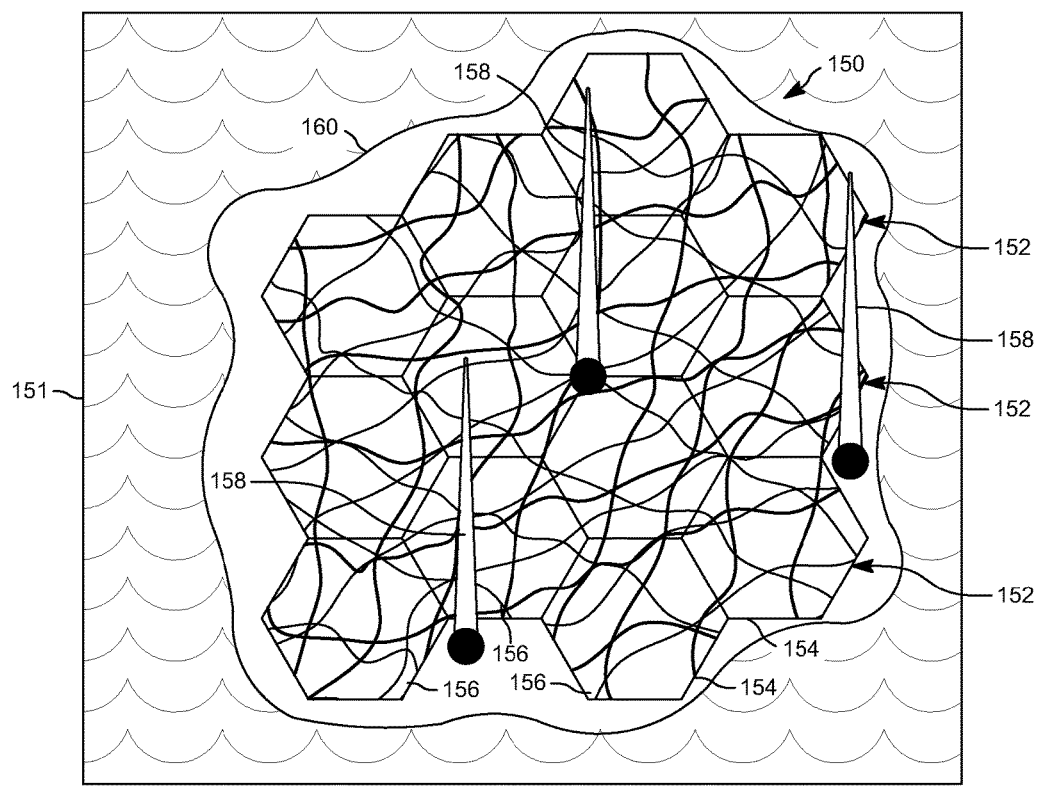
FIG. 4 illustrates another example of a floating calibration target for an image sensor deployed in a body of water.

FIG. 4 illustrates another example of a floating calibration target 150 that could be employed, for example to implement the floating calibration target 54 of FIG. 1. The floating calibration target 150 is illustrated as being deployed in a body of water 151 (e.g., an ocean, a sea, a lake, etc.). The floating calibration target 150 includes K number of floatation devices 152. Each of the K number of floatation devices 152 includes a hexagonal floating net 154 and fiber optic cables 156 connected between edges of the hexagonal floating net 154.

Each of the K number of hexagonal floating nets 154 can be formed of buoyant material, such as a plastic or polypropylene. Moreover, in some examples, the hexagonal floating nets can be rigid or semi-rigid.

The fiber optic cables 156 can be illuminated with a light at a specific color (wavelength) from a light source. The light source can be embedded in the corresponding hexagonal floating net 154. For instance, each light source can be a laser or an LED that pumps (injects) light into one or more of the fiber optic cables 156. In such a situation, the light source can be powered by a battery. In some examples, the light sources (the laser or LED) can be implemented and operated on a boat that deploys the calibration target 150 with possible remote control operations. In other examples, the light sources can be integrated with the hexagonal floating nets 154.

In some examples, each fiber optic cable in a particular hexagonal floating net 154 can be injected with the same color (wavelength) of light. In other examples, different fiber optic cables in a particular hexagonal floating net 154 can be injected with different colors (wavelengths) of light.

The outputting of light by the fiber optic cables 156 can be controlled, for example, by N number of wireless beacons 158. For instance, each hexagonal floating net 154 of the K number of floatation devices 152 can have a (low power) wireless interface (e.g., Bluetooth or ZigBee) that communicates with the N number of wireless beacons 110 to control an output state (e.g., enable, disable, color and/or intensity) of the light sources, thereby controlling an output of the fiber optic cables 158. The N number of wireless beacons 158 can be employed to implement the wireless beacons 60 of FIG. 1. The N number of wireless beacons 158 can communicate with an external device (e.g., the remote controller 70 of FIG. 1. The N number of wireless beacons 158 (based on commands from the external source) can control an intensity and color (wavelength) of light output by the fiber optic cables 156 of each of the floatation devices 152. By varying the intensity and color output by the fiber optic cables 156, the N number of floatation devices can generate nearly any color. In this manner specific wavelengths of light can be transmitted through the atmosphere to the image sensor.

The floating calibration target 150 can also include a seine net 160 that can circumscribe the K number of floatation devices 152. The seine net 160 can be implemented, for example, as a purse seine that includes a plurality of rings. A purse line can pass through the rings of the seine net 160 to draw the K number of floatation devices 152 closer toward each other. Moreover, the (hexagon) shape of each of the hexagonal floating nets 154 causes the floatation devices 152 to nest, thereby forming a substantially contiguous platform for the floating calibration target 150. The plurality of rings (or some subset thereof, such as a top portion) can be tensioned to facilitate retrieval of the K number of floatation devices 152.

The floating calibration target 150 can be easily deployed in remote locations (e.g., by a boat) that is away from artificial sources of light to maintain a high contrast between the body of water 151 and the floating calibration target 150. Further, since the structures of the floating calibration target 150 are lightweight (e.g., the hexagonal floating nets 154 and fiber optic cables 156), the floating calibration target 150 can be deployed and/or retracted with standard fish net equipment. Additionally, boats employed to deploy a purse seine net (which can be referred to as "purse seiners") can be equipped with a hold for fish that can serve as the hold for the K number of floatation devices 152. Moreover, due to the simplicity of the design of the floating calibration target 150, only minimal and infrequent maintenance, such as battery recharging/changing and/or anti-biofouling techniques may be needed.

Additionally, while the example of the floating calibration target 150 is illustrated as being deployed in the body of water 151, in other examples, the floating calibration target 150 could be a terrestrial calibration target deployed on land or ice/snow (e.g., an iceberg or a mountain).

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A floating calibration target for an image sensor comprising:
   a plurality of hexagonally shaped floatation devices that each emit light at one or more predetermined wavelengths; and
   a seine net circumscribing the plurality of hexagonally shaped floatation devices, wherein the seine net draws the plurality of hexagonally shaped floatation devices toward each other to form a substantially contiguous surface for the floating calibration target.

2. The floating calibration target of claim 1, wherein the seine net is a purse seine net having a plurality of rings.

3. The floating calibration target of claim 2, wherein the purse seine comprising:
   a purse line passing through the plurality of rings to apply tension on the plurality of hexagonally shaped floatation devices.

4. The floating calibration target of claim 1, wherein each of the plurality of hexagonally shaped floatation devices comprises:
   a buoy having a translucent hexagonally shaped top surface; and
   a plurality of light emitting devices positioned on the hexagonally shaped top surface.

5. The floating calibration target of claim 4, wherein each of the plurality of light emitting devices comprises a light emitting diode (LED).

6. The floating calibration target of claim 1, wherein each of the plurality of hexagonally shaped floatation devices comprises:
   a hexagonally shaped buoyant net; and
   a plurality of fiber optic cables extending between edges of the hexagonally shaped buoyant net, wherein each of the plurality of fiber optic cables transmits light injected therein.

7. The floating calibration target of claim 6, wherein a given set of the plurality of fiber optic cables transmits light in a given spectral band and another set of the plurality of fiber optic cables transmits light in another spectral band.

8. The floating calibration target of claim 1, wherein the plurality of hexagonally shaped floatation devices output light sufficient to saturate at least one pixel of an image sensor deployed on an aircraft.

9. The floating calibration target of claim 8, wherein the contiguous surface of the floating calibration target has an area of at least 25 square meters.

10. The floating calibration target of claim 1, wherein the plurality of hexagonally shaped floatation devices output light sufficient to saturate at least one pixel of an image sensor deployed on a satellite.

11. The floating calibration target of claim 10, wherein the contiguous surface of the floating calibration target has an area of at least 62,500 square meters.

12. The floating calibration target of claim 1, further comprising:
    a wireless beacon that outputs location information of the floating calibration target, wherein the location information characterizes current geographic coordinates of the floating calibration target.

13. The floating calibration target of claim 12, wherein the wireless beacon comprises a global navigation satellite system (GNSS) that detects satellite signals and calculates the location information.

14. The floating calibration target of claim 12, wherein the wireless beacon communicates with an external computing device to control the output of the plurality of hexagonally shaped floatation devices.

15. A floating calibration target for an image sensor comprising:
    a plurality of floatation devices, wherein each of the plurality of floatation devices comprises:
      a buoy with a hexagonal surface;
      a plurality of light sources affixed to the hexagonal surface that each emit light at one or more predetermined wavelengths;
    a seine net circumscribing the plurality of floatation devices, wherein the seine net applies a force that draws the plurality of floatation devices toward each other to form a substantially contiguous surface for the floating calibration target; and
    a wireless beacon to output data characterizing a current location of the floatation calibration target.

16. The floating calibration target of claim 15, wherein the plurality of light sources of each of the plurality of floatation devices comprises a light emitting diode.

17. The floating calibration target of claim 15, wherein the plurality of floatation devices output light sufficient to saturate at least one pixel of the image sensor.

18. A floating calibration target for an image sensor comprising:
    a plurality of floatation devices, wherein each of the plurality of floatation devices comprises:
      a hexagonally shaped net formed of a buoyant material; and a plurality of fiber optic cables extending between edges of the hexagonally shaped net, wherein each of the plurality of fiber optic cables outputs light injected therein;
   a seine net circumscribing the plurality of floatation devices, wherein the seine net applies a force that draws the plurality of floatation devices toward each other to form a substantially contiguous surface for the floating calibration target; and
   a wireless beacon to control the output of light emitted by the plurality of floatation devices.

19. The floating calibration target of claim 18, wherein the plurality of floatation devices output light sufficient to saturate at least one pixel of the image sensor.

20. The floating calibration target of claim 18, wherein the wireless beacon provides location data characterizing a current location of the floating calibration target.

* * * * *